(12) United States Patent
Lu et al.

(10) Patent No.: US 7,383,618 B2
(45) Date of Patent: Jun. 10, 2008

(54) HINGE FOR A PORTABLE DEVICE

(75) Inventors: Sheng-Nan Lu, Shulin (TW); Hsiang-Chi Chien, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 0 days.

(21) Appl. No.: 11/285,167

(22) Filed: Nov. 23, 2005

(65) Prior Publication Data

US 2007/0113379 A1    May 24, 2007

(51) Int. Cl.
*E05D 11/10* (2006.01)
*E05F 1/08* (2006.01)

(52) U.S. Cl. .......................................... 16/330; 16/303

(58) Field of Classification Search ................ 16/303, 16/297, 330, 340, 342, 334, 380; 455/575.1, 455/90.3; 379/433.13
See application file for complete search history.

(56) References Cited

U.S. PATENT DOCUMENTS

| | | | | |
|---|---|---|---|---|
| 5,697,124 A * | 12/1997 | Jung | ............................ | 16/341 |
| 6,175,990 B1 * | 1/2001 | Kato et al. | ...................... | 16/334 |
| 6,530,121 B2 * | 3/2003 | Hayashi | ......................... | 16/330 |
| 6,808,402 B2 * | 10/2004 | Ryu et al. | .................... | 439/165 |
| 6,963,766 B2 * | 11/2005 | Jung | ......................... | 455/575.3 |
| 7,150,072 B2 * | 12/2006 | Huang et al. | .................. | 16/330 |
| 7,171,247 B2 * | 1/2007 | Han | ......................... | 455/575.3 |
| 7,173,825 B2 * | 2/2007 | Han et al. | ...................... | 16/330 |
| 2002/0157213 A1 * | 10/2002 | Oshima et al. | ................ | 16/342 |
| 2004/0237259 A1 * | 12/2004 | Huang et al. | .................. | 16/330 |
| 2004/0244147 A1 * | 12/2004 | Qin et al. | ....................... | 16/330 |

* cited by examiner

*Primary Examiner*—Robert J Sandy
*Assistant Examiner*—Ruth C Rodriguez
(74) *Attorney, Agent, or Firm*—Hershkovitz & Associates, LLC; Abe Hershkovitz

(57) ABSTRACT

A hinge for a portable device has a body, a spring, a slide and a shaft. The body has a cavity and multiple retaining tabs. The spring is mounted in the cavity in the body. The slide is mounted slidably in the cavity in the body, abuts the spring and has a positioning element. The shaft is mounted to the body, rotatably engages the slide and has a positioning element and an annular groove. The positioning element on the shaft rotatably engages the positioning element on the slide. The annular groove rotatably engages the retaining tabs on the body. The shaft is mounted to the body without additional fasteners such as C-shaped clasps so the hinge has a simple structure and a low cost.

5 Claims, 4 Drawing Sheets

US 7,383,618 B2

HINGE FOR A PORTABLE DEVICE

BACKGROUND OF THE INVENTION

1. Field of the Invention

The present invention relates to a hinge, and more particularly to a hinge that has a simple structure and low cost for use in a portable device.

2. Description of the Related Art

Portable devices such as cell phones, notebooks and pocket gaming devices are widely used these days. Some of these portable electronic devices are foldable to make the devices more compact for convenient carrying.

A conventional foldable device has two separate casings and a hinge. The casings are connected pivotally to each other through the hinge so the foldable device can be opened or closed. The hinge is mounted between the casings and has a body, a spring, a shaft, and a C-shaped clasp. The body is hollow, is mounted in one of the casings and has a cavity. The spring is mounted in the cavity of the body. The shaft is mounted rotatably in the cavity in the casing and has an inner end and an outer end extending out of the body and mounted to the other casing. The clasp is mounted in the cavity in the casing and rotatably grips the inner end of the shaft to prevent the shaft from falling out of the body.

However, a hinge with a clasp has a complicated structure, so assembling the hinge is more time consuming and costly.

To overcome the shortcomings, the present invention provides a hinge for a portable device to mitigate or obviate the aforementioned problems.

SUMMARY OF THE INVENTION

The main objective of the invention is to provide a hinge that has a simple structure and a low cost for use in a portable device.

A hinge for a portable device in accordance with the present invention comprises a body, a spring, a slide and a shaft.

The body has a cavity and multiple retaining tabs.

The spring is mounted in the cavity in the body.

The slide is mounted slidably in the cavity in the body, abuts the spring and has a positioning element.

The shaft is mounted to the body, rotatably engages the slide and has a center axis, a positioning element, a head and an annular groove. The head is coaxially formed on one end of the shaft outside the body and has a first outside wall. The positioning element is coaxially formed on one end of the shaft outside the body and has a second outside wall and rotatably engages the positioning element on the slide. The annular groove is formed between the head and the positioning element so a neck is formed between the head and the positioning element and rotatably engages the retaining tabs on the body. The neck has a third outside wall. A first distance from the center axis to the first outside wall and a second distance from the center axis to the second outside wall are larger than a third distance from the center axis to the third outside wall.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
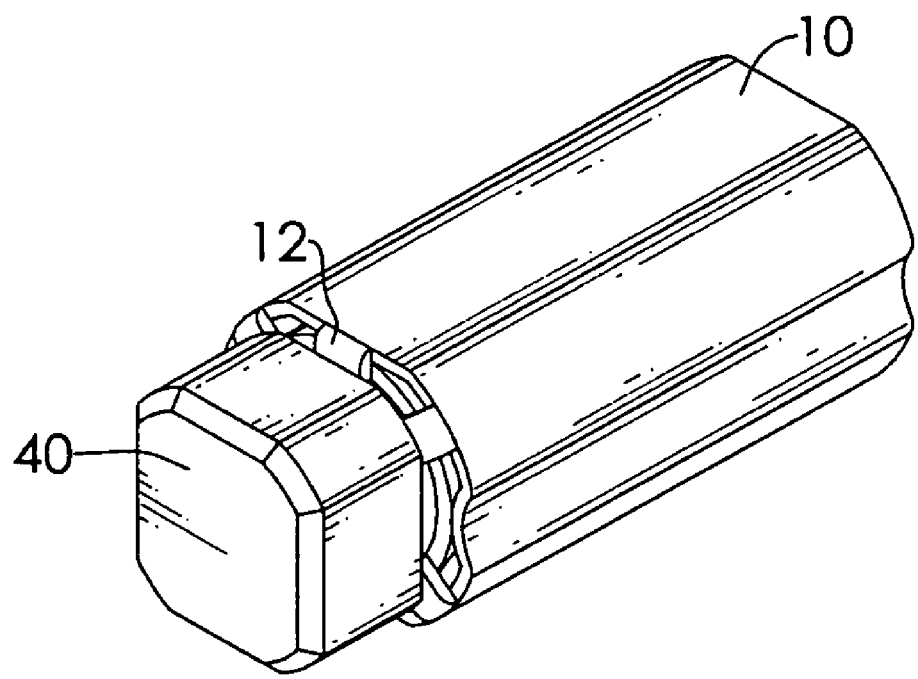
FIG. 1 is a perspective view of a hinge for a portable device in accordance with the present invention.
Figure 3:
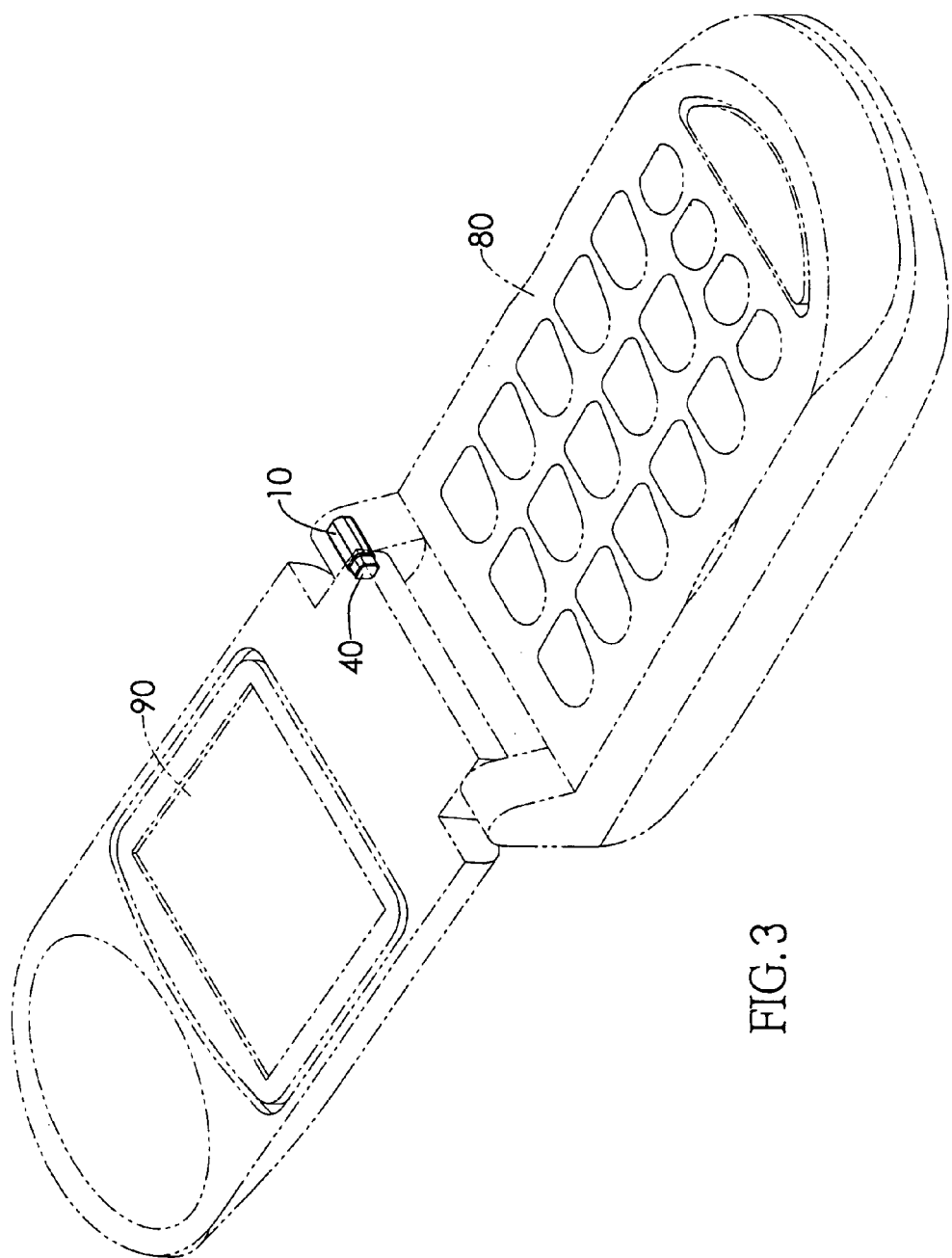
FIG. 3 is a perspective view of a cell phone with the hinge in FIG. 1.

With reference to FIGS. 1 and 3, a hinge in accordance with the present invention is used with a foldable cell phone. The cell phone has two casings (80, 90) connected pivotally to each other through the hinge.

Figure 2:
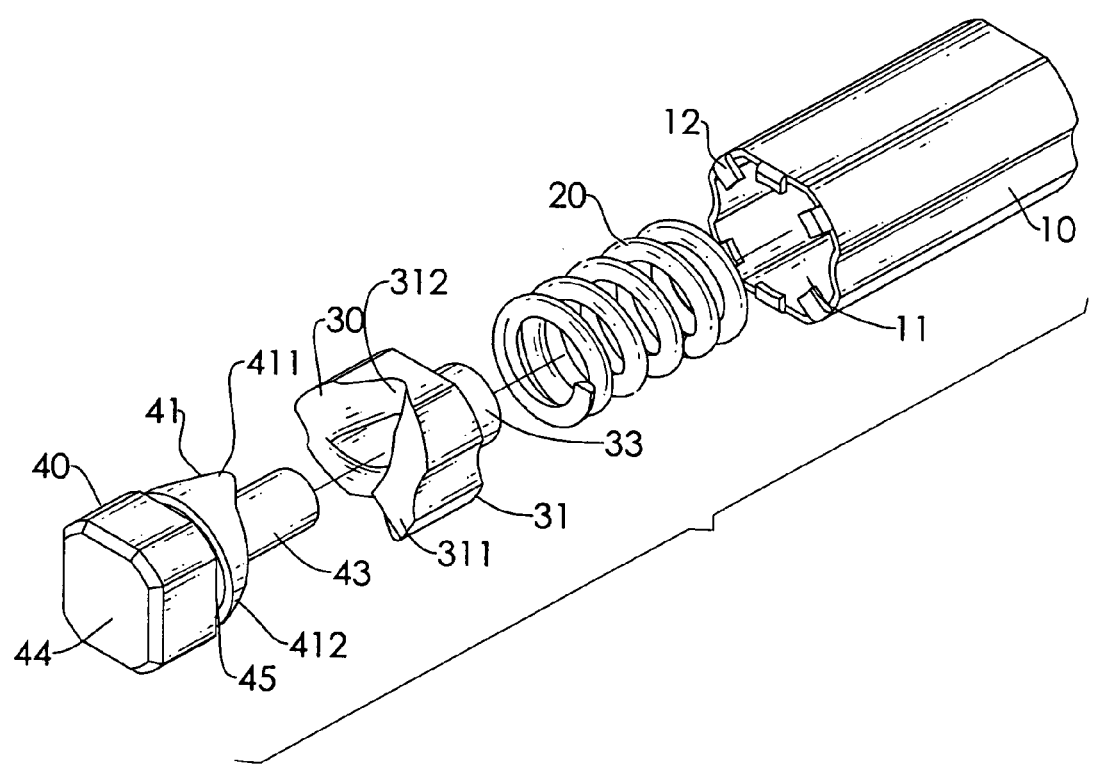
FIG. 2 is an exploded perspective view of the hinge in FIG. 1.

With further reference to FIG. 2, the hinge has a hollow body (10), a spring (20), a slide (30) and a shaft (40).

The body (10) is mounted on one casing (80) of the cell phone and has a cavity (11) and multiple retaining tabs (12). The cavity (11) is defined longitudinally in the body (10) and has a noncircular cross section and an open end. The open end has an edge. The retaining tabs (12) are formed on and extend inward radially from the edge of the open end of the cavity (11).

The spring (20) is mounted in the cavity (11) in the body (10).

Figure 4:
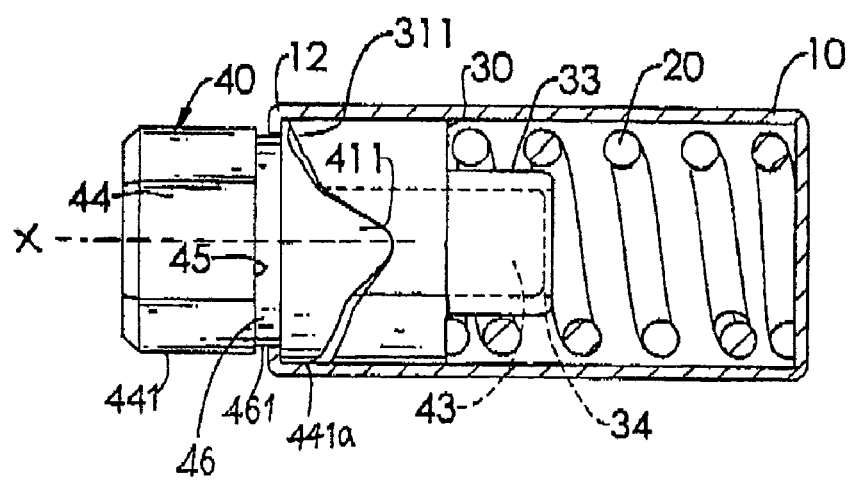
FIG. 4 is a side view in partial section of the hinge in FIG. 1.

With reference to FIG. 4, the slide (30) is mounted slidably in the cavity (11) in the body (10), abuts the spring (20) and has a noncircular cross section, two ends, a positioning element (31), an alignment protrusion (33) and an alignment hole (34). The noncircular cross section of the slide (30) corresponds to that of the cavity (11) in the body (10) so the slide (30) cannot rotate relative to the body (10). The positioning element (31) is formed on one end of the slide (30) and may have multiple ridges (311) and multiple detents (312). The ridges (311) are arranged circularly. The detents (312) are respectively defined between adjacent ridges (311). The alignment protrusion (33) is formed on the other end of the slide (30) opposite the positioning element (31) and extends into the spring (20). The alignment hole (34) is defined longitudinal in the slide (30).

The shaft (40) is mounted to the body (10), rotatably engages the slide (30) and has a center axis (X), two ends, a head (44), a positioning element (41), an annular groove (45) and an alignment protrusion (43). The head (44) is coaxially formed on one end of the shaft (40) outside the body (10) and mounted to the other casing (90) of the cell phone and has a first outside wall (441). The positioning element (41) is coaxially formed on the other end of the shaft (40) opposite to the head (44), is mounted rotatably in the cavity (11) in the body (10), rotatably engages the positioning element (31) of the slide (30), may have multiple ridges (411) and multiple detents (412) and has a second outside wall (411 a). The ridges (411) are arranged circularly, correspond to and detachably engage the detents (312) of the positioning element (31) on the slide (30). The detents (412) are defined between adjacent ridges (411), correspond to and detachably engage the ridges (311) of the positioning element (31) on the slide (30). The annular groove (45) is defined in the shaft (40) between the head (44) and the positioning element (41) to form a neck (46) between the head (44) and the positioning element (41) and rotatably engages the retaining tabs (12) on the body (10) by receiving the retaining tabs (12) in the annular groove (45). The neck (46) has a third outside wall (461). The engagement of the annular groove (45) and the retaining tabs (12) allows the shaft (30) to be mounted securely to the body (10) without additional fasteners. A first distance from the center axis (X) to the first outside wall (441) and a second distance (411a) from the center axis (X) to the second outside wall are larger than a third distance from the center axis (X) to the third outside wall (461). The alignment protrusion (43) is formed on the shaft (40) opposite to the head (44) and extends in the alignment hole (34) in the slide (30) so the shaft (40) is always aligned with the slide (30) no matter how the slide (30) moves relative to the shaft (30).

Figure 5:
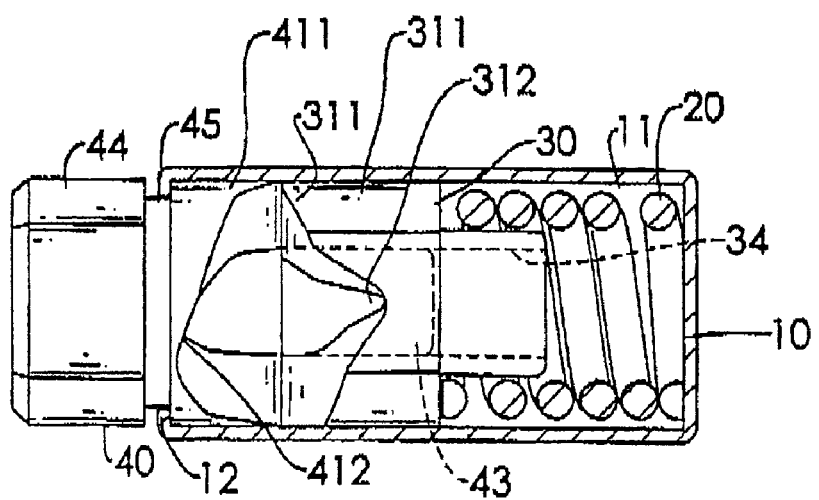
FIG. 5 is an operational side view in partial section of the hinge in FIG. 4.

With reference to FIG. 5, unfolding or folding the cell phone halfway causes the positioning element (41) of the shaft (40) to disengage from the positioning element (31) of the slide (30) and press against the slide (30). The ridges (411, 311) on the shaft (40) and slide (30) press against each other so the pressed slide (30) moves into the cavity (30) and compresses the spring (20). At this time, the hinge is in a freed configuration so the cell phone can be easily folded or unfolded. When the cell phone is unfolded or folded completely, the positioning elements (41, 31) reengage each other and the hinge is in a locked configuration so the cell phone will not be easily folded or unfolded by an inadvertent force.

The shaft (40) is mounted to the body (10) without any fasteners such as C-shaped clasps so the hinge has a simple structure and a low cost.

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge for a portable device comprising:
   a hollow body having
     a cavity defined longitudinally in the body and having a noncircular cross section and an open end having an edge; and
     multiple retaining tabs being formed on and extending inward radially from the edge of the open end of the cavity;
   a spring mounted in the cavity in the body;
   a slide mounted slidably in the cavity in the body, abutting the spring and having
     a noncircular cross section corresponding to the noncircular cross section of the cavity in the body;
     two ends; and
     a positioning element formed on one end of the slide; and
   a shaft mounted to the body, rotatably engaging the slide and having
     a center axis;
     two ends;
     a head coaxially formed on one end of the shaft outside the body and having a first outside wall;
     a positioning element coaxially formed on the other end of the shaft opposite the head, mounted rotatably in the cavity in the body, rotatably engaging the positioning element of the slide, and having a second outside wall; and
     an annular groove defined in shaft between the head and the positioning element, so that a neck is formed between the head and the positioning element, rotably engaging the retaining tabs on the body, wherein the neck has a third outside wall and wherein a first distance from the center axis to the first outside wall and a second distance from the center axis to the second outside wall are larger than a third distance from the center axis to the third outside wall.

2. The hinge as claimed in claim 1, wherein:
   the positioning element on the slide has
     multiple ridges arranged circularly; and
     multiple detents respectively defined between adjacent ridges; and
   the positioning element on the shaft has
     multiple ridges arranged circularly, corresponding to and detachably engaging the detents of the positioning element on the slide; and
     multiple detents defined between adjacent ridges, corresponding to and detachably engaging the ridges of the positioning element on the slide.

3. The hinge as claimed in claim 2, wherein the slide further has an alignment protrusion formed on the slide opposite to the positioning element on the slide and extending into the spring.

4. The hinge as claimed in claim 2, wherein:
   the slide further has an alignment hole defined longitudinal in the slide; and
   the shaft further has an alignment protrusion formed on the shaft opposite the head and extending into the alignment hole in the slide.

5. The hinge as claimed in claim 3, wherein:
   the slide further has an alignment hole defined longitudinal in the slide; and
   the shaft further has an alignment protrusion formed on the shaft opposite the head and extending into the alignment hole in the slide.

* * * * *